Dec. 27, 1960    J. OLLENDORF ET AL    2,965,962
HERMETIC SEAL AND METHOD OF MAKING THE SAME
Filed Dec. 7, 1954

INVENTORS
JOEL OLLENDORF
& HERBERT R. MEISEL
BY
ATTORNEY

United States Patent Office 2,965,962
Patented Dec. 27, 1960

2,965,962

HERMETIC SEAL AND METHOD OF MAKING THE SAME

Joel Ollendorf, Maplewood, and Herbert R. Meisel, South Orange, N.J., assignors to Radio Corporation of America, a corporation of Delaware Filed Dec. 7, 1954, Ser. No. 473,710

9 Claims. (Cl. 29—470.1)

This invention relates to the encapsulation of electrical devices such as semiconductor devices and, in particular, to an improved hermetically sealed housing for semiconductor devices and the like and a method of making such a housing.

Semiconductor devices, such as transistors, which have rectifying barriers, such as P-N junctions, are sensitive to the active components of the atmosphere and to many other chemical substances. Transistors have been encased or potted in certain materials, such as plastics, to protect them from such deterioration and to provide mechanical, chemical and electrical stability. However, such arrangements often are not entirely satisfactory and in some preferred constructions a transistor should be sealed in a gas-tight envelope, preferably a metal envelope.

A metal envelope or housing for a transistor generally comprises a header stem portion including an insulating member of glass or the like, on which the transistor itself is mounted. The header insulation preferably is molded into an annular metallic ring which is sealed within the open end of a hollow metal shell and in gas-tight engagement therewith. Previously, the seal between the metal shell and the header has been effected either by welding or by hot soldering.

If welding is employed, ordinarily the parts to be welded are provided with flanges which are bonded together. Thus the overall size of the completed device is undesirably increased. In addition, the heat of welding may have an adverse effect on the transistor element.

In a hot soldering process, the parts to be bonded together must be scrupulously clean and a flux and elevated temperature are generally required. Thus, the flux may form a source of contamination of the transistor and the applied heat may damage the transistor.

Accordingly, an important object of this invention is to provide a new and improved hermetically sealed housing for a transistor and a new and improved method for forming said housing.

Another object of this invention is to provide an improved method of hermetically sealing a transistor envelope without the application of heat from an external source to the parts to be sealed.

A further object of this invention is to provide a new and improved cold hermetic metal-to-metal seal and a new and improved method of forming the same.

Still another object of the invention is to provide a new and improved cold, metal-to-metal hermetic seal and a method of forming the same wherein extreme care need not be exercised in cleaning the parts to be bonded together.

In general, the principles and objects of this invention are applicable, for example, to a housing or envelope for a transistor or other semiconductor device which comprises a stem or header and a hollow, metal shell sealed together in hermetic engagement by a cold hermetic seal. A cold hermetic seal is a seal formed between two metal parts, separated by a metal softer than either of the parts, by the application of pressure and without the application of heat thereto from an external source. The cooperating parts of the header annular ring and shell which contact each other at the seal are first tinned, that is they are provided with a thin coating of a soft metallic material in gas-tight engagement therewith. The soft metal is softer than the material of either of the header or the shell which will flow comparatively readily without the application of excessive pressure. The tinned header ring and shell have such a thickness that when the header is inserted into the shell, an interference fit results. Next, without the application of heat from an external source, the header and shell are pressed together so that the header is inserted the desired distance within the shell. The shearing forces produced due to the interference fit of the parts remove any oxide film present and, in general, provide a surface cleaning action. The soft metallic material is caused to flow and to consolidate into a substantially uniform mass under the compression forces produced between the header and the shell as they are forced together whereby a gas-tight seal is formed.

The invention is described in greater detail with reference to the accompanying drawing in which.

Similar reference characters are applied to similar elements throughout the drawing.

Figure 1:
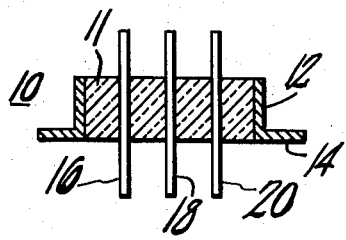
Fig. 1 is a sectional elevational view of one embodiment of a header portion of a device being made according to the invention.

According to the method of the invention, a device, for example a transistor, is sealed in a gas-tight housing in the following manner.

A header or stem 10 is provided including an insulating disk 11 of glass or the like, preferably of circular cross-section provided with a ring 12 of metal, such as cold rolled steel hermetically sealed thereto. For example, the insulation 11 may be molded contiguously within the ring 12. If desired, the ring may have a flange 14. Support rods 16, 18, 20 of nickel or the like are hermetically sealed in the disk 11 and extend therethrough with greater lengths of the rods projecting beneath the disk than above it.

Figure 2:
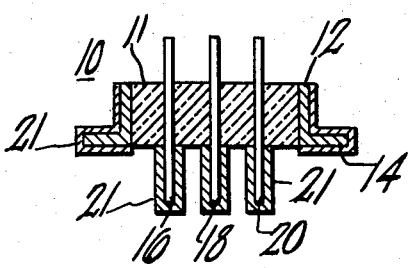
Fig. 2 is a sectional elevational view of the header portion of Fig. 1 at an intermediate stage in the manufacture of the device.

Referring to Figure 2, the metal ring 12 is tinned, that is, it is provided with a thin gas-tight coating 21 of a soft metal. By a soft metal is meant one which is deformable at approximately room temperature. One suitable soft metal comprises an alloy of tin and lead in the ratio of 60 to 40 parts by weight, respectively. This tin-lead alloy has a melting point in the range of 183° C. to 238° C. The portion of the metal coating 21 on the ring 12, that is, the portion to be sealed to a metal shell should be smooth and continuous and free of pits and fillets which might physically distort the shell during sealing and thereby cause leaks in the completed seal. The softer the solder, the less critical is this condition. It is believed that the soft metal layer 21 forms an intermolecular bond with the ring 12.

The stem tinning operation is performed by applying flux and inserting the stem, long leads first, into a pot of the 60–40 tin-lead solder which is maintained, preferably, at a temperature in the range of 330° C. to 360° C. This, incidentally, results in the lower ends of leads 16, 18 and 20 also being tinned. The stem is held in the solder for approximately three seconds. The stem is then removed, the excess solder is shaken off, and the stem is placed in boiling deionized water for approximately five minutes to effect degreasing. The stem is then further degreased in tetrachlorethylene vapor at approximately 130° C. for about ten minutes after which it is dried and stored pending final assembly of the transistor housing.

Figure 4:
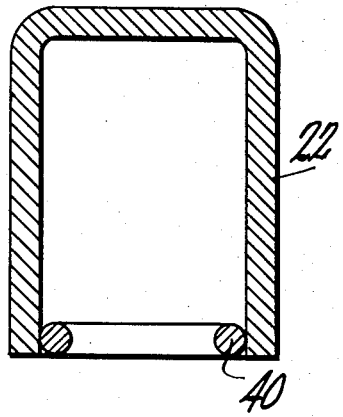
Fig. 4 is a sectional elevational view of the shell portion of the device before assembly with the header portion; and, Fig. 5 is a sectional elevational view of a completed device made in accordance with the invention.

The metal shell 22 of the transistor assembly is in the form of a cylinder having an open end, preferably, circular in cross-section and of any strong, ductile material, such as commercial nickel-silver which is an alloy of nickel, copper and zinc and is prepared first by degreasing in hot tetrachlorethylene vapors. The shell is then provided with a gas-tight coating of a soft metallic material. The shell 22 may be coated or tinned by an electroplating operation or it may be tinned in the following manner. Referring to Figure 4, a pre-formed ring 40 of a soft metal, for example the tin-lead alloy described above and having a rosin flux core, is positioned in the open end of the shell and is bonded thereto by the application of heat. The ring 40 is then reamed to size so that, at a later time, when the header 10 is inserted into the shell, the two parts interfere by an amount in the range of 5 to 20 mils. The shell is then degreased in tetrachlorethylene vapor and in boiling deionized water. Here, too, the soft metal is believed to form an intermolecular bond with the metal of the shell.

If desired, the shell 22 may be tinned by being dipped into the selected molten metal. However, by such a procedure, it is difficult to reproducibly achieve a continuous smooth coating of metal.

Figure 3:
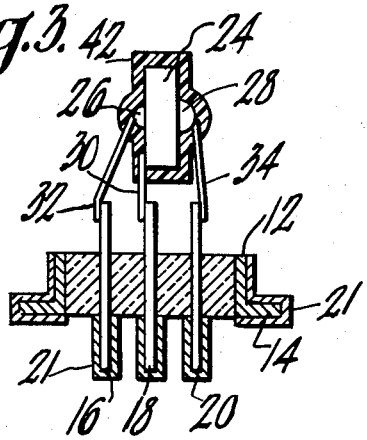
Fig. 3 is a sectional elevational view of the device at a later stage in its manufacture.

Next, referring to Figure 3, a device to be sealed within the housing of the invention is mounted on the stem or header 10. If the selected device is a transistor including a semiconductor crystal 24, emitter electrode 26, collector electrode 28, and base electrode 30, it is mounted with the base electrode bonded to the rod 18, the emitter electrode connected to the rod 16 by a connector wire 32, and the collector electrode bonded to the rod 20 by a connector wire 34.

Figure 5:
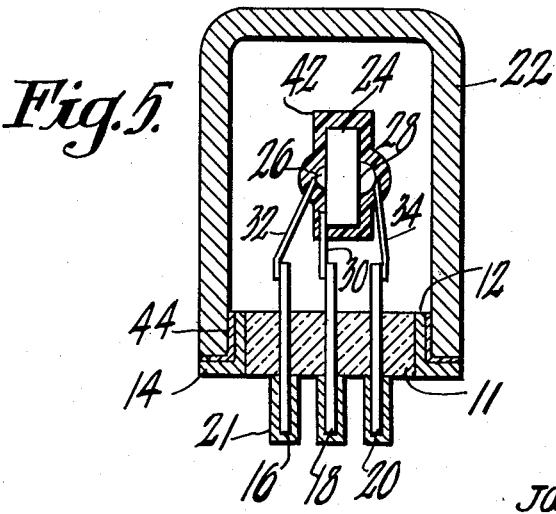

Next, if desired, the transistor is provided with a layer 42 of a protective material such as a plastic and, further, if desired, the shell 22, is filled with a quantity of potting material (not shown). One of the advantages of the method of the invention is that elaborate cleaning procedures are not required to prepare the tinned header and shell for final assembly and for formation of the hermetic seal between these parts. The actual sealing operation may be performed by hand or, preferably, in an arbor press with the header assembly placed in the upper chuck of the press and the shell placed in the lower chuck. This arrangement is particularly desirable if the shell has been filled with a plastic material. The press is operated to force the header into the shell and pressure is applied until the metal shell contacts and seats on the flange or lip 14 of the header as shown in Figure 5. A sufficiently soft material is employed in the layer 21 and ring 40 to allow adequate pressure to be applied with minimum distortion of the header and shell.

Since the header and shell are in interference fit, as they are pressed together, a wiping or shearing action between the parts removes any oxide coating or other foreign matter thereon. Furthermore, as the parts are put together, the soft metal of the layer 21 and ring 40 flow and the compression forces in the seal area cause consolidation of the metals whereby a substantially homogeneous mass of metal 44 results and the desired hermetic seal is formed.

As set forth above, the shell 22 and header 10 are preferably circular in cross-section. This configuration is preferred because the quality of a hermetic seal is determined by the nature and distribution of the forces pressing the header and shell together and the most uniform and evenly distributed forces exist between sealed parts which are circular in cross section.

In the partice of the present invention, the method of tinning the header and shell is not critical and any suitable method may be employed for this purpose. Soft metal compositions other than that given in the example can be used to make the seal. For example, indium may be employed as the tinning material or a soft indium-tin alloy may be used. One such suitable alloy includes 25 parts by weight of tin and 75 parts by weight of indium.

In addition, the principles of the invention may be employed to form other than hermetic metal-to-metal seals, for example ceramic-to-metal seals and the like.

What is claimed is:

1. A method of forming a hermetic seal between a shell having an open end and a member having a periphery adapted to be inserted into the open end of said shell and hermetically sealed thereto; said method comprising the steps of providing a continuous layer of a solid soft metal about said periphery, providing a ring-shaped continuous layer of a solid soft metal on the inner surface of said shell adjacent said open end such that the inside diameter of the open end of said shell is smaller than the outside diameter of the periphery of said member by an amount such as to provide an interference fit therebetween, and thereafter forcing said member into said shell a predetermined distance without the application of heat from an external source thereby causing said solid soft metal to flow and consolidate and form the hermetic seal.

2. The method of claim 1 wherein said interference fit is within a range of from about 5 mils to about 20 mils.

3. A method of forming a hermetic seal between a shell having an open end and a header having a periphery adapted to be inserted into the open end of said shell and hermetically sealed thereto; said method comprising the steps of: providing a continuous layer of a solid soft metal about said periphery, providing a ring-shaped continuous layer of a solid soft metal on the inner surface of said shell adjacent said open end such that the inside diameter of said shell is smaller than the outside diameter of the periphery of said header by an amount such as to provide an interference fit therebetween, and forcing said header into said shell a predetermined distance whereby said solid soft metal flows and consolidates and forms a hermetic seal between said header and said shell.

4. A method of forming a hermetic seal between a shell having an open end and a header having a periphery adapted to be inserted into the open end of said shell and hermetically sealed thereto; said method comprising the steps of: providing a continuous layer of a solid soft metal about said periphery, providing a ring-shaped continuous layer of a solid soft metal on the inner surface of said shell adjacent said open end such that the inside diameter of the open end of said shell is smaller than the outside diameter of the periphery of said header by an amount such as to provide an interference fit therebetween, and pressing said header into said shell a predetermined distance without the application of heat from an external source thereby causing said solid soft metal to flow and consolidate and form the hermetic seal.

5. A method of forming a hermetic seal between a shell having an open end and a header having a periphery adapted to be inserted into the open end of said shell and hermetically sealed thereto; said method comprising the steps of: providing a continuous layer of a solid soft metal about said periphery and in gas-tight engagement therewith, providing a ring-shaped continuous layer of a solid soft metal on the inner surface of said shell adjacent said open end and in gas-tight engagement therewith such that the inside diameter of the open end of said shell is smaller than the outside diameter of the periphery of said header by an amount such as to provide an interference fit therebetween, and inserting said header into said shell a predetermined distance without the application of heat from an external source and thereby causing said solid soft metal to flow and consolidate and form the hermetic seal.

6. The method of claim 5 wherein both said solid soft metals comprise a tin-lead alloy.

7. A method of forming a hermetic seal between a shell having an open end and a header having a periphery adapted to be inserted into the open end of said shell and hermetically sealed thereto; said method comprising the steps of: tinning said header to provide a continuous layer of a solid soft metal about said periphery, tinning said shell to provide a ring-shaped continuous layer on the inner surface of said shell adjacent the open end thereof such that the inner diameter of said open end is smaller than the outer diameter of the periphery of said header by an amount such as to provide an interference fit therebetween, and thereafter forcing said header into said shell a predetermined distance whereby said solid soft metal flows and consolidates and forms a hermetic seal between said header and said shell.

8. A method of forming a hermetic seal between a shell having an open end and a member having a periphery adapted to be inserted into the open end of said shell and hermetically sealed thereto; said method comprising the steps of: providing a continuous layer of a solid soft metal about said periphery, providing a ring-shaped continuous layer of a solid soft metal on the inner surface of said shell adjacent said open end such that the inner diameter of said open shell is substantially smaller than the outer diameter of said periphery, reaming said continuous layer on said inner surface an amount such as to provide an interference fit between said open end and said periphery, and thereafter forcing said member into said shell a predetermined distance whereby said solid soft metal flows and consolidates and forms a hermetic seal between said member and said shell.

9. The method of claim 8 wherein said interference fit is within a range of from about 5 mils to about 20 mils.

References Cited in the file of this patent

UNITED STATES PATENTS

| | | |
|---|---|---|
| 1,615,008 | Ferguson | Jan. 18, 1927 |
| 1,979,470 | Johnston | Nov. 6, 1934 |
| 2,094,483 | Weder | Sept. 28, 1937 |
| 2,407,552 | Hoesel | Sept. 10, 1946 |
| 2,503,429 | Ziegler | Apr. 11, 1950 |
| 2,671,746 | Brew | Mar. 9, 1954 |
| 2,754,065 | Hawley | July 10, 1956 |